United States Patent
Tanaka

(10) Patent No.: US 8,280,717 B2
(45) Date of Patent: Oct. 2, 2012

(54) TAPE PRINTER, METHOD OF CONTROLLING TAPE PRINTER, AND PROGRAM

(75) Inventor: Seiji Tanaka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 257 days.

(21) Appl. No.: 12/722,371

(22) Filed: Mar. 11, 2010

(65) Prior Publication Data

US 2010/0250233 A1     Sep. 30, 2010

(30) Foreign Application Priority Data

Mar. 25, 2009   (JP) ................. 2009-073842

(51) Int. Cl.
G06F 17/28     (2006.01)
G06F 17/20     (2006.01)
G06F 17/27     (2006.01)
G06F 17/21     (2006.01)

(52) U.S. Cl. ........... 704/3; 704/4; 704/8; 704/9; 704/10; 704/270; 704/275

(58) Field of Classification Search ............ 704/3, 4, 704/9, 10, 8, 270, 275; 400/76, 109, 484; 715/200, 239, 249
See application file for complete search history.

(56) References Cited

U.S. PATENT DOCUMENTS

| | | | | |
|---|---|---|---|---|
| 6,006,221 A | * | 12/1999 | Liddy et al. ............. | 1/1 |
| 7,033,092 B2 | * | 4/2006 | Horii et al. ............. | 400/76 |
| 7,711,542 B2 | * | 5/2010 | Fux et al. ............. | 704/3 |
| 7,778,944 B2 | * | 8/2010 | Bangalore ............. | 706/12 |
| 7,865,358 B2 | * | 1/2011 | Green et al. ............. | 704/10 |
| 2002/0184003 A1 | * | 12/2002 | Hakkinen et al. ............. | 704/8 |
| 2005/0058485 A1 | * | 3/2005 | Horii et al. ............. | 400/76 |
| 2007/0112553 A1 | * | 5/2007 | Jacobson ............. | 704/2 |
| 2007/0201069 A1 | | 8/2007 | Tanaka et al. ............. | 358/1.13 |
| 2007/0276653 A1 | * | 11/2007 | Greenwald et al. ............. | 704/10 |
| 2008/0059146 A1 | * | 3/2008 | Liu ............. | 704/2 |
| 2008/0101581 A1 | * | 5/2008 | Pearson ............. | 379/218.01 |

FOREIGN PATENT DOCUMENTS

JP     2007-079721     3/2007

* cited by examiner

Primary Examiner — Douglas Godbold
Assistant Examiner — Edgar Guerra-Erazo
(74) Attorney, Agent, or Firm — DLA Piper LLP (US)

(57) ABSTRACT

A tape printer provided with a standard phrase print function adapted to print a plurality of standard phrases as a set, includes: a selection section adapted to select an input language in the standard phrase print function; a search table creation section adapted to create a search table corresponding to the selected input language; an extraction section adapted to extract the standard phrase of the selected input language and the standard phrase of a language other than the selected input language based on the created search table, the standard phrase of the selected input language and the standard phrase of the other language corresponding to each other; and a print section adapted to print the extracted standard phrases as the set.

5 Claims, 12 Drawing Sheets

| RECORD NUMBER | JAPANESE INPUT | JAPANESE PRINT DESCRIPTION | ENGLISH SUBSEQUENT RECORD NUMBER | ENGLISH INPUT | ENGLISH PRINT DESCRIPTION | CHINESE SUBSEQUENT RECORD NUMBER | CHINESE INPUT | CHINESE PRINT DESCRIPTION | KOREAN SUBSEQUENT RECORD UMBER | KOREAN INPUT | KOREAN PRINT DESCRIPTION |
|---|---|---|---|---|---|---|---|---|---|---|---|
| 1 | あいす くりーむ | アイス クリーム | 350 | | Ice Cream | 115 | | 冰淇淋 | 42 | | 아이스크 림 |
| 2 | あいべや | 相部屋 | 643 | | Sharing a room | 20 | | 同室 | 420 | | 동숙 |
| ⋮ | | | | | | | | | | | |
| 365 | しゅくはく しせつ | 宿泊施設 | 514 | | Accommo dation | 210 | | 住宿場所 | 600 | | 숙박시설 |
| ⋮ | | | | | | | | | | | |
| 410 | しんしょうし ゃようせつび | 身障者用 設備 | 365 | | Accessible facility | 390 | | 残疾人用 设备 | 856 | | 장애인 편의시설 |
| ⋮ | | | | | | | | | | | |
| 594 | にゅうじょう けん | 入場券 | 100 | | Admission ticket | 796 | | 入场券 | 236 | | 입장권 |
| ⋮ | | | | | | | | | | | |

| RECORD NUMBER | JAPANESE INPUT | JAPANESE PRINT DESCRIPTION | ENGLISH SUBSEQUENT RECORD NUMBER | ENGLISH INPUT | ENGLISH PRINT DESCRIPTION | CHINESE SUBSEQUENT RECORD NUMBER | CHINESE INPUT | CHINESE PRINT DESCRIPTION | KOREAN SUBSEQUENT RECORD NUMBER | KOREAN INPUT | KOREAN PRINT DESCRIPTION |
|---|---|---|---|---|---|---|---|---|---|---|---|
| 1 | あいすくりーむ | アイスクリーム | 350 | Ice Cream | Ice Cream | 115 | | 冰淇淋 | 42 | | 아이스크림 |
| 2 | あいべや | 相部屋 | 643 | Sharing a room | Sharing a room | 20 | | 同室 | 420 | | 동숙 |
| .. | | | | | | | | | | | |
| 365 | しゅくはくしせつ | 宿泊施設 | 514 | Accommodation | Accommodation | 210 | | 住宿場所 | 600 | | 숙박시설 |
| .. | | | | | | | | | | | |
| 410 | しんしょうしゃようせつび | 身障者用設備 | 365 | Accessible facility | Accessible facility | 390 | | 残疾人用設备 | 856 | | 장애인 편의시설 |
| .. | | | | | | | | | | | |
| 594 | にゅうじょうけん | 入場券 | 100 | Admission ticket | Admission ticket | 796 | | 入場券 | 236 | | 입장권 |
| .. | | | | | | | | | | | |

FIG. 8

| RECORD NUMBER | あ | い | ... | ん |
|---|---|---|---|---|
| | 1 | 28 | ... | 890 |

FIG. 9A

| RECORD NUMBER | A | B | ... | Z |
|---|---|---|---|---|
| | 410 | 539 | ... | 561 |

FIG. 9B

| No. | ENGLISH INPUT | SUBSEQUENT RECORD NUMBER |
|---|---|---|
| 410 | Accessible facility | 365 |
| 365 | Accommodation | 514 |
| 514 | Additional charge | 170 |
| 170 | Admission fee | 594 |
| 595 | Admission fee | 594 |
| 594 | Admission ticket | 100 |
| 100 | Adult | 101 |
| 443 | Adult | 101 |
| 101 | Adult's fee | 204 |
| 444 | Adult's fee | 204 |
| 204 | Aid station | 58 |
| 58 | Air conditioner | 273 |
| 226 | Air conditioner | 273 |
| 796 | Air conditioner | 273 |
| 273 | Aircraft | 223 |
| 223 | Airport | 21 |
| 21 | Alcohlic beverages | 319 |
| 319 | Alcohlic beverages | 604 |
| 604 | All you can drink | 475 |

| No. | ENGLISH INPUT | SUBSEQUENT RECORD NUMBER |
|---|---|---|
| 475 | All you can eat | 22 |
| 22 | Aluminium | 216 |
| 216 | Amount | 748 |
| 748 | Amusement park | 681 |
| 681 | Annex | 299 |
| 299 | Antique | 418 |
| 418 | Aquarium | 300 |
| 300 | Arrival | 641 |
| 559 | Arrival | 641 |
| 641 | Art museum | 64 |
| 64 | ATM | 164 |
| 164 | Authorized personnel only | 340 |
| 340 | Automatic | 226 |
| 76 | Automatic lock | 343 |
| 343 | Automatic door | 341 |
| 341 | Automatic ticket gate | 9 |
| 9 | Autumn | 374 |
| 374 | Available | 539 |

FIG. 10

| No. | ENGLISH INPUT | SUBSEQUENT RECORD NUMBER |
|---|---|---|
| 514 | Additional charge | 170 |
| 170 | Admission fee | 594 |
| 595 | Admission fee | 594 |
| 594 | Admission ticket | 100 |

FIG. 11A

| No. | ENGLISH INPUT | SUBSEQUENT RECORD NUMBER |
|---|---|---|
| 170 | Admission fee | 594 |
| 595 | Admission fee | 594 |
| 594 | Admission ticket | 100 |

FIG. 11B

| No. | ENGLISH INPUT | SUBSEQUENT RECORD NUMBER |
|---|---|---|
| 594 | Admission ticket | 100 |

FIG. 11C

TAPE PRINTER, METHOD OF CONTROLLING TAPE PRINTER, AND PROGRAM

The entire disclosure of Japanese Patent Application No. 2009-073842, filed on Mar. 25, 2009, is expressly incorporated by reference herein.

BACKGROUND

1. Technical Field

The present invention relates to a tape printer for printing a print image having translation phrases, which respectively describe one phrase in a plurality of languages, disposed side by side on a tape-like print medium, a method of controlling the tape printer, and a program therefor.

2. Related Art

There is known a tape printer for printing a print image on a print medium (a tape), the print image having a plurality of translation phrases, which respectively describe at least one phrase in a plurality of languages (Japanese, English, Chinese, and Korean), disposed side by side (see, e.g., JP-A-2007-79721)

In the case in which a print layout is edited in such a tape printer as described in the related art document mentioned above, a search for a table of standard phrases is firstly conducted using so-called prefix search for searching for words and phrases each having a prefix coincident with a search term using Japanese Hiragana input, and then, one set is selected out of the coincident phrase candidates, thereby determining the phase as the print object. It should be noted that the print layout of the group of standard phrases thus selected is set so that the Japanese standard phrase always comes at the forefront thereof.

In the case in which the search for the standard phrase is conducted using the method described above, since the search for the table of the standard phrases is conducted using the Japanese Hiragana input, the user is requested to know Japanese expressed as at least Hiragana and the standard phases. However, it is not necessarily the case that all of the users of the tape printer understand Japanese.

Further, there is also the case in which it is desired to dispose the standard phrase in a language other than Japanese at the forefront thereof in the print layout of the one group of standard phrases.

SUMMARY

An advantage of some aspects of the invention is to provide a tape printer in which the input language can freely be selected in the standard phrase print function for printing a plurality of standard phrases as a set, and is capable of disposing the standard phrase of the selected input language at the forefront of the print layout, and a control method and a program therefor.

According to an aspect of the invention capable of solving the problem described above, there is provided a tape printer having a standard phrase print function adapted to print a plurality of standard phrases as a set, the tape printer including a selection section adapted to select an input language in the standard phrase print function, a search table creation section adapted to create a search table corresponding to the selected input language, an extraction section adapted to extract the standard phrase of the selected input language and the standard phrase of a language other than the selected input language based on the created search table, the standard phrase of the selected input language and the standard phrase of the other language corresponding to each other, and a print section adapted to print the extracted standard phrases as the set.

According to the configuration described above, the input language in the standard phrase print function can be selected. Therefore, it is not necessarily required to conduct search of the table of the standard phrases using the Japanese Hiragana input as is requested in the related art printer, and even the user unfamiliar to Japanese can conduct the search with the language suitable for the user. Further, since the search table corresponding to the selected language is created, there is no need for previously preparing the search tables of the respective languages, and the compression is not exerted on both of the product development cost and the memory for storing the search table.

Further, according to another aspect of the invention, in the tape printer of the above aspect of the invention, the print section performs printing so that the standard phrase of the selected input language disposed at a top of the extracted standard phrases.

According to the configuration described above, since there can be obtained the print result in which the standard phrase of the selected input language is disposed at the top thereof, it is possible to perform the tape printing best suitable for the user who has selected the input language.

Further, according to still another aspect of the invention, in the tape printer of the above aspect of the invention, there is further provided a standard phrase table having the standard phrase of a specific language provided with a sequential number along a specific rule and the standard phrase of a language other than the specific language so as to correspond to each other, the sequential number designating a subsequent search destination being assigned to the standard phrase of the other language, and the search table creation section creates the search table based on an input character and the sequential numbers.

According to the configuration described above, the search table can be created from the standard phrase table provided previously using the input character and the sequential numbers. Therefore, even by the input character of the language other than the specific language, the appropriate standard phrase can be extracted from the search table corresponding to the language.

Further, according to yet another aspect of the invention, in the tape printer of the above aspect of the invention, the selection section automatically selects an input language, which is selected in a function other than the standard phrase print function, in the standard phrase print function.

According to the configuration described above, it can be assumed that the input language executed in the function other than the standard phrase print function is the input language used with relatively high frequency in the device. Therefore, even in the case of switching the function in use to the standard phrase print function, since the input language used with high frequency is automatically selected, it is possible to provide the tape printer superior in operability.

Further, according to still yet another aspect of the invention capable of solving the problem described above, there is provided a method of controlling a tape printer having a standard phrase print function adapted to print a plurality of standard phrases as a set, the method including the steps of (a) selecting an input language in the standard phrase print function, (b) creating a search table corresponding to the selected input language, (c) extracting the standard phrase of the selected input language and the standard phrase of a language other than the selected input language based on the created search table, the standard phrase of the selected input language and the standard phrase of the other language corresponding to each other, and (d) printing the extracted standard phrases as the set.

According to the configuration described above, since the steps of selecting the input language in the standard phrase print function for printing the plurality of standard phrases as a set, and creating the search table corresponding to the selected language are included, there is no need for conducting the search of the table of the standard phrases using the Japanese Hiragana input, which is required in the related art printer, and therefore, even the user unfamiliar to Japanese can conduct the search for the standard phrase using the language suitable for the user.

Further, according to further another aspect of the invention capable of solving the problem described above, there is provided a program adapted to make a computer, which is provided to a tape printer having a standard phrase print function adapted to print a plurality of standard phrases as a set, perform a process including the steps of (a) selecting an input language in the standard phrase print function, (b) creating a search table corresponding to the selected input language, (c) extracting the standard phrase of the selected input language and the standard phrase of a language other than the selected input language based on the created search table, the standard phrase of the selected input language and the standard phrase of the other language corresponding to each other, and (d) printing the extracted standard phrases as the set.

BRIEF DESCRIPTION OF THE DRAWINGS

The invention will be described with reference to the accompanying drawings, wherein like numbers reference like elements.

FIG. 8 is a diagram showing an example of a standard phrase table provided to the tape printer according to the present embodiment.

FIGS. 9A and 9B are first record tables each for designating a first record number of the standard phrase table.

FIG. 10 is a diagram showing an example of a search table.

FIGS. 11A to 11C are diagrams each showing the search table obtained by narrowing down the search table shown in FIG. 10.

DESCRIPTION OF AN EXEMPLARY EMBODIMENT

Hereinafter, a tape printer according to an embodiment of the invention will be explained with reference to the accompanying drawings. The tape printer 1 according to the present embodiment edits the print image, which has a plurality of translation phrases describing one phrase in a plurality of languages, respectively, disposed side-by-side, on an image editing screen, then performs printing of the tape-like print medium with the print image, and then cuts the posterior end of the printed tape, thereby forming a label.

Figure 1:
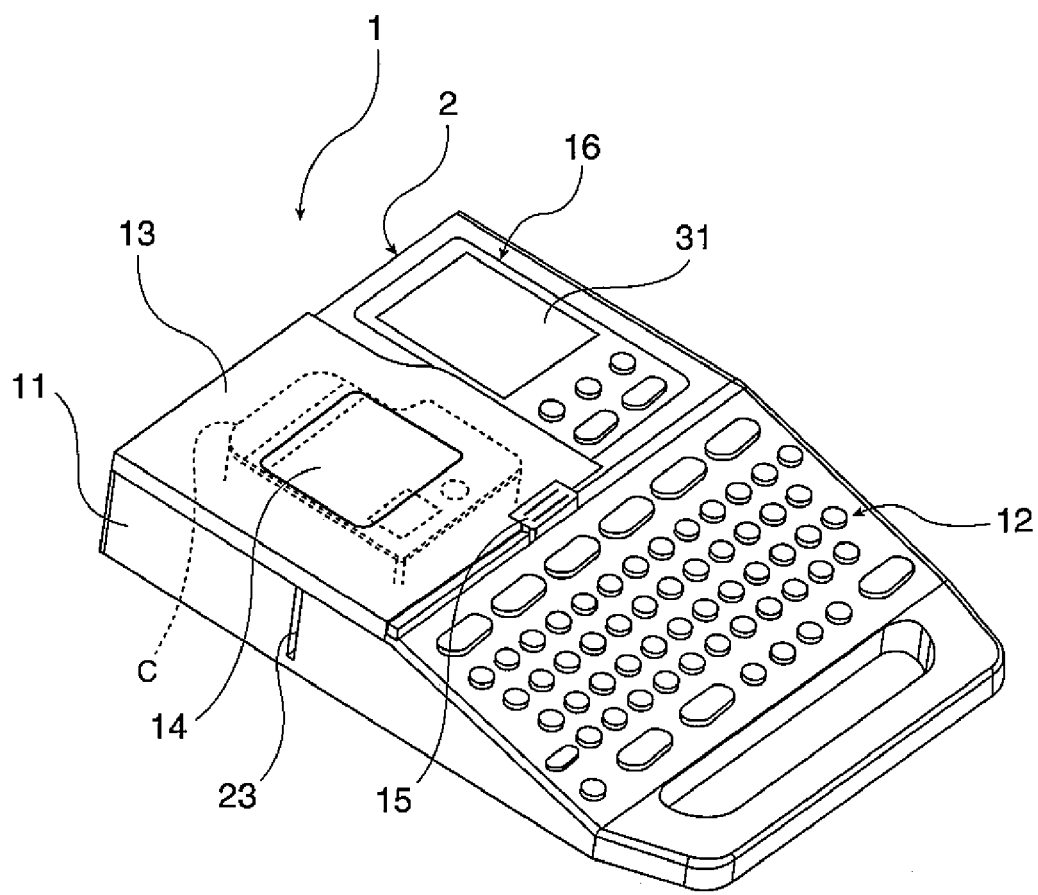
FIG. 1 is a schematic perspective view of a tape printer according to the present embodiment.
Figure 2:
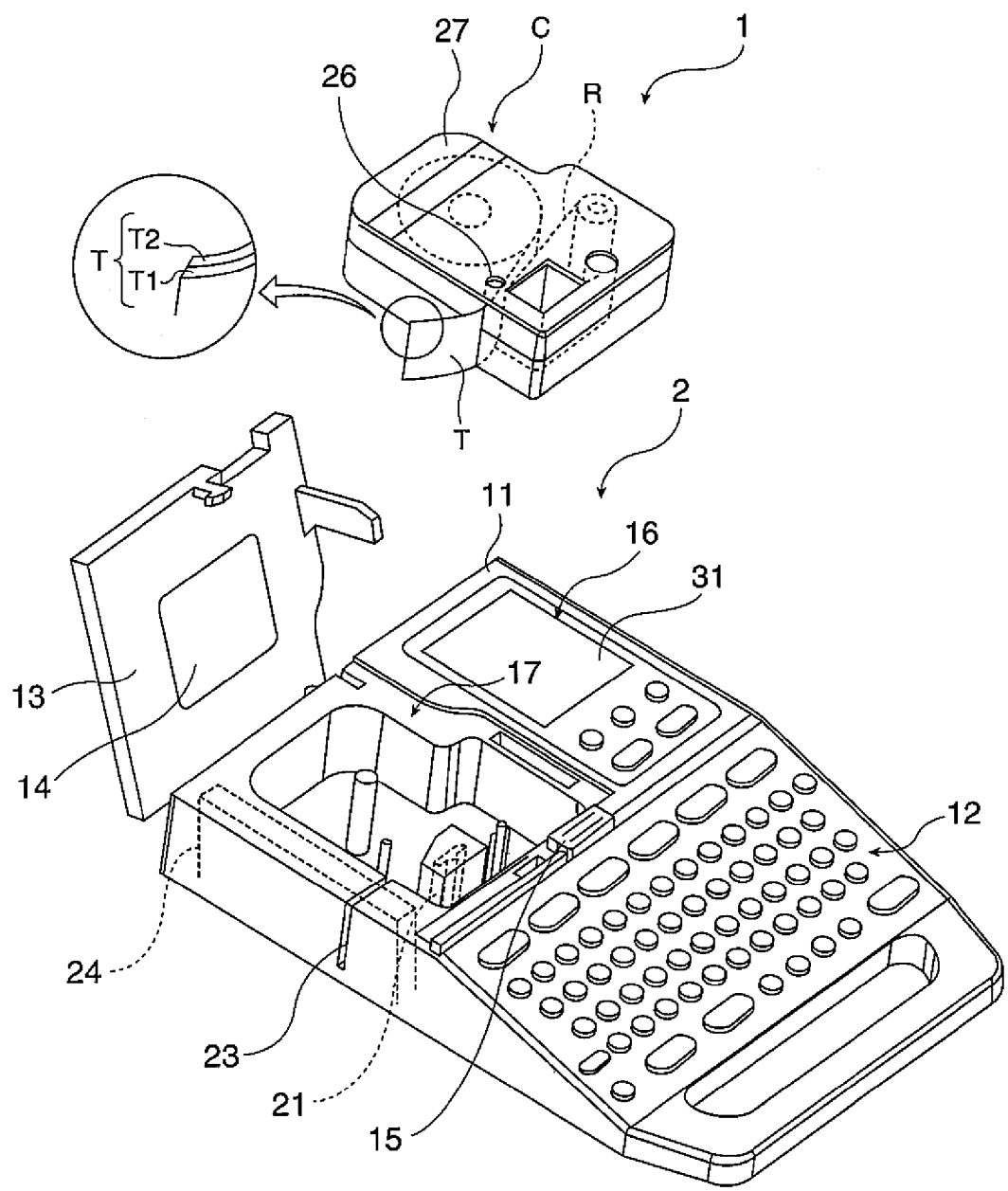
FIG. 2 is a schematic perspective view showing the state in which an openable lid of the tape printer shown in FIG. 1 is opened.

As shown in FIGS. 1 and 2, the tape printer 1 is provided with a device main body 2 for performing a printing process on a processing tape T, and a tape cartridge C housing the processing tape T and an ink ribbon R, and detachably attached to the device main body 2.

The device main body 2 has an outer shell formed of a device case 11, and on an upper surface of an anterior half of the device case 11, there is disposed a keyboard 12 having various keys. An upper left surface of a posterior half of the device case 11 is provided with an openable lid 13 widely, and an upper surface of the openable lid 13 is provided with an inspection window 14 used for visually checking presence/absence of the tape cartridge C, and in front of the openable lid 13 there is disposed a lid open button 15 used for opening the openable lid 13. An upper right surface of a posterior half of the device case 11 is provided with a rectangular display 16 for displaying an input result from the keyboard 12.

When pressing the lid open button 15 to open the openable lid 13, there appears a cartridge mounting section 17, in which the tape cartridge C is mounted, formed inside thereof as a hollow. The cartridge mounting section 17 is provided with a tape identification sensor 18 (see FIG. 4) composed of, for example, a plurality of micro-switches disposed at a corner thereof.

Further, the cartridge mounting section 17 is provided with a print head 21 having a heater element. When mounting the tape cartridge C, the print head 21 has indirect contact with a platen roller 26 via the processing tape T and the ink ribbon R, thereby forming a print standby state. Then, a printing process (thermal transfer of the ink from the ink ribbon R to the processing tape T) is performed on the processing tape T while feeding the processing tape T and the ink ribbon R by a power transmission mechanism (not shown) composed of a print feed motor 22 (see FIG. 4), a gear train, and so on.

On the left side of the device case 11, there is provided a tape ejection slot 23 communicating the cartridge mounting section 17 and the outside of the device, and a cutter unit 24 driven by a cutter motor 25 (see FIG. 4) is incorporated in the device case 11 adjacently to the tape ejection slot 23, thereby cutting the posterior end of the processing tape T, on which the printing process has been performed, to form a tape segment.

Although not shown in the drawings, on the right side of the device case 11 there are provided a power supply port for supplying power and a connector for connecting the tape printer 1 to an external device such as a personal computer not shown. Therefore, the tape printer 1 is also capable of acquiring a print image created by the personal computer or the like and printing it on the processing tape T, besides the print image created based on the data input from the own keyboard 12. Further, although not shown in the drawings, inside the device case 11, there is mounted a circuit board constituting a control section 60 (described later) for performing overall control of the tape printer 1.

The processing tape T is composed of a recording tape T1 coated with an adhesive on the reverse side thereof, and a release tape T2 attached to the recording tape T1 with the adhesive. Therefore, the user can peel off the release tape T2 from the tape segment of the processing tape T thus cut out after the printing process, and stick the recording tape T1 to an object of sticking.

It should be noted that the reverse side of the cartridge case 27 is provided with a plurality of small detection holes (not shown) so that the plurality of holes is recognized by the tape identification sensor 18, thereby making it possible to identify the type (e.g., a tape width) of the processing tape T.

The display 16 is formed of a dot-matrix liquid crystal display device, provided with a display screen 31 capable of displaying a display image data and a plurality of indicators (not shown) for displaying various setting conditions inside a rectangular shape thereof, and used when the user inputs data from the keyboard 12 to create/edit the print image (print data) or visually confirms the result thereof.

Figure 3:
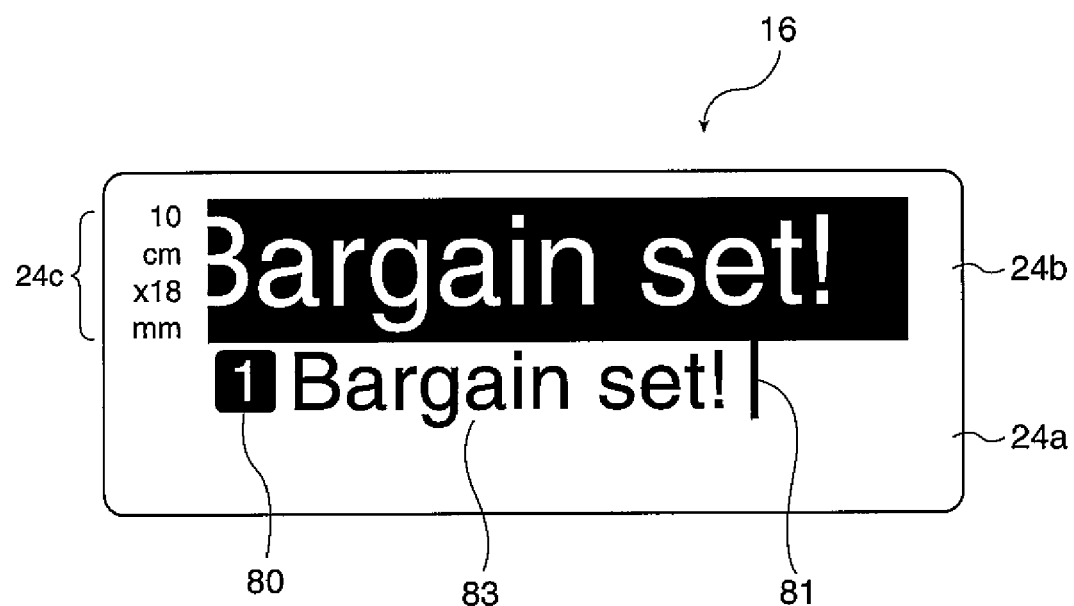
FIG. 3 is a schematic diagram showing a configuration of a display.

As shown in FIG. 3, the display 16 has a landscape display screen, and an input/edit screen is displayed on the display 16 as a default screen (an initial screen). The input/edit screen is provided with an input/edit area 24a set at a lower portion thereof and for performing an input/edit process, and a layout display area 24b set at an upper portion thereof and for displaying the print layout point by point. It should be noted that as the print layout there is displayed a blank layout in the state in which no character is input, and then a layout of an arbitrary character string based on a fixed character string 83 input therein.

In the input/edit area 24a, a character string input from the keyboard 12 is displayed horizontally, and in the case in which the character string spans a plurality of rows, the rows thereof are displayed so as to be arranged vertically. In the case in which the character string input to the input/edit area 24a is an unfixed character string, the character string is displayed as positive dots in a white/black reversed manner on the one hand, and in the case in which the unfixed character string becomes a fixed character string 83 in response to an operation of a determination key, the character string is displayed as negative dots in a normal manner on the other hand. Further, in the input/edit area 24a there are displayed a line head mark 80 indicating the number of the line where each of the lines of the character string is located, and a cursor 81 for indicating an input/edit position.

On the left side 24c of the layout display area 24b of the display 16, there is displayed the tape width thus detected and the tape length of the tape to be formed as small numerals, and on the right side of the numerals, there is displayed the print layout in a magnified manner. Thus, it is arranged that the size, the layout balance, the margins, and so on can be checked prior to the printing process.

In a specific explanation, in the layout display area 24b of the display 16 shown in FIG. 3, there is displayed the print layout of the fixed character string 83 ("Bargain set!") thus input thereto with the tape displayed as the positive dots and the characters as the negative dots in the white/black reversed manner with respect to the tape width (18 mm) and the tape length (10 cm).

In the keyboard 12, there are arranged a function key group for designating various kinds of processes and so on besides a character key group including a Kana key group, a numerical key group, an alphabet key group, and so on. It is arranged that characters such as Hiragana, Katakana, Kanji, numbers, and alphabetical characters can be input from the keyboard 12 using the character key group and a conversion key of the function key group.

The function key group includes a power key, a print key for designating the printing process, the conversion key for converting (e.g., from Kana characters to Kanji characters) input by the character key group, a selection key used for determination of the characters converted in response to the operation of the conversion key, a line feed, and designation of selection in a selection screen, a cancel key for canceling various operations, a delete key for aborting various processes or deleting the characters once fixed according to needs, a restoration key for restoring (pasting) the characters deleted in response to the operation of the delete key, four cursor keys for moving the cursor 81 (see FIG. 3) described later from side to side and up and down, respectively, and so on. It should be noted that it is also possible to provide the keys corresponding respectively to the key inputs to make the inputs or to make the inputs using less number of keys by combining the keys with a shift key or the like. The keyboard 12 inputs various instructions and data to the control section 60 in response to the operations of the various types of keys described above.

Figure 4:
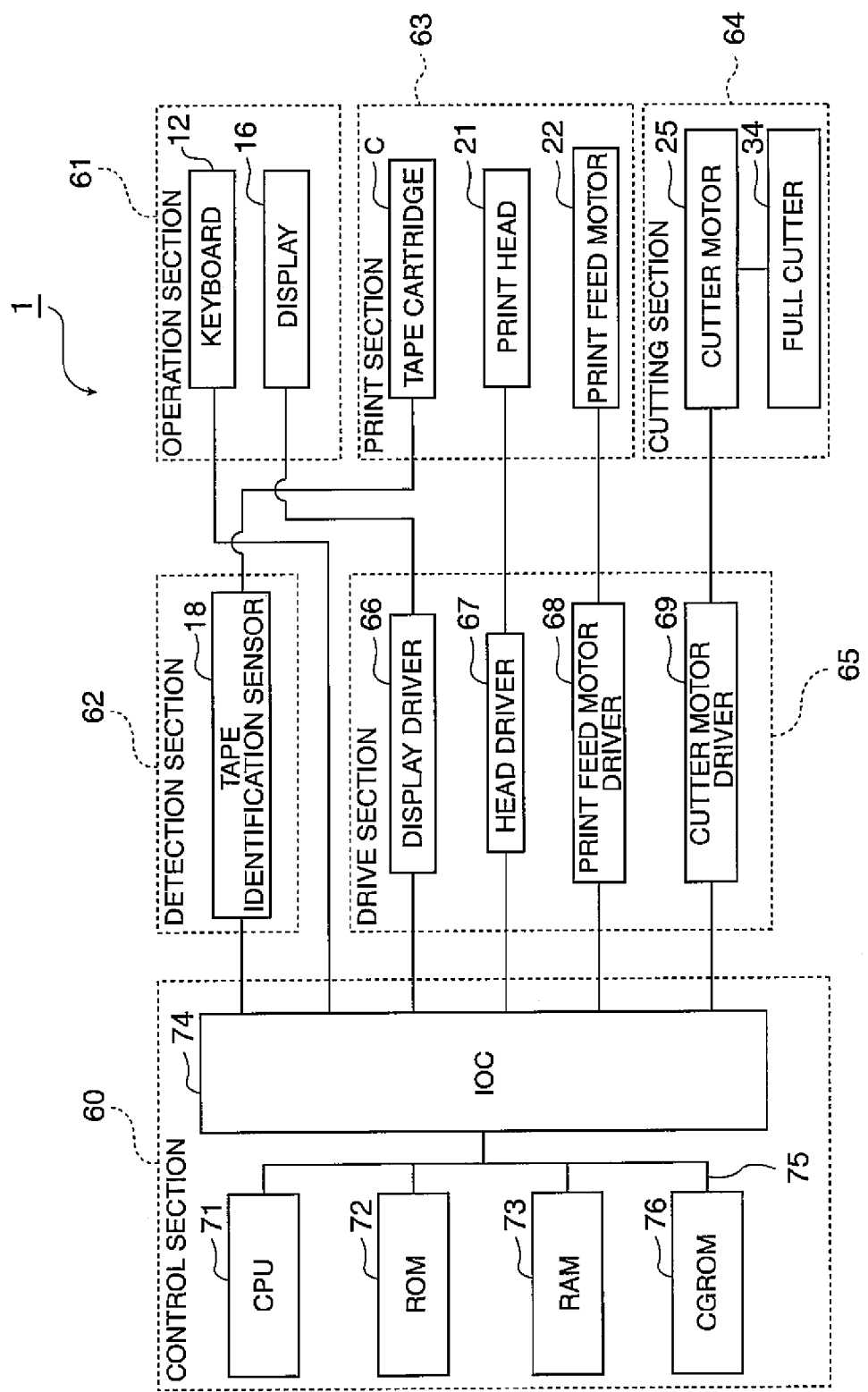
FIG. 4 is a block diagram showing an internal configuration of the tape printer.

Hereinafter, the internal control of the tape printer 1 will be explained with reference to FIG. 4. The tape printer 1 has an operation section 61, a detection section 62, a print section 63, a cutting section 64, a drive section 65, and the control section 60 connected to these sections and controlling the entire tape printer 1.

The operation section 61 functions as a user interface such as the data input from the character keys and the function keys disposed on the keyboard 12 or the display of, for example, the print data on the display 16. The detection section 62 has the tape identification sensor 18, and detects the type of the processing tape T (the tape cartridge C). The print section 63 has the tape cartridge C, the print head 21, and the print feed motor 22, and performs printing on the processing tape T by the print head 21 in accordance with the print data thus generated while feeding the processing tape T and the ink ribbon R. The cutting section 64 has the cutter unit 24 composed of a full cutter 34 for cutting the processing tape T and the cutter motor 25 for driving the full cutter 34, and cuts out the processing tape T, on which the print process has been performed by the print section 63, so as to have a predetermined length, thereby forming a label. The drive section 65 has a display driver 66, a head driver 67, a print feed motor driver 68, and a cutter motor driver 69, and drives the respective sections.

The control section 60 is provided with a central processing unit (CPU) 71, a read only memory (ROM) 72 for storing a control program for the CPU 71 performing the various control processes, a random access memory (RAM) 73 used as a work area for the various control processes, a CGROM (character storage section) 76 for storing the character data such as the characters or symbols, and an input/output controller (hereinafter referred to as an "input output controller (IOC)") 74, and these constituents are connected to each other via an internal bus 75.

In a specific example of the process, the CPU 71 receives an input state switching instruction via the IOC 74 in response to holding down of an input switching key included in the keyboard 12. The CPU 71 drives the display driver 66 via the IOC 74 to switch the input state in the order of "Roman character→Kana→ABC" every time the input switching key is held down.

Further, when receiving a label print instruction in response to holding down of the print key 15e, the CPU 71 makes the head driver 67 and the print feed motor driver 68 drive the respective sections via the IOC 74, thereby performing the printing process of the label edited. When the label printing process is terminated, the CPU 71 makes the cutter motor driver 69 drive the cutter motor 25 to cut the processing tape T on which the printing process has been performed so as to have a predetermined length.

Further, the CPU 71 receives a symbol input instruction via the IOC 74 in response to holding down of the symbol key included in the keyboard 12. The CPU 71 retrieves the symbol corresponding to the character code, which is input thereto, from the CGROM 76, and displays it on the display 16 via the display driver 66.

Figure 5:
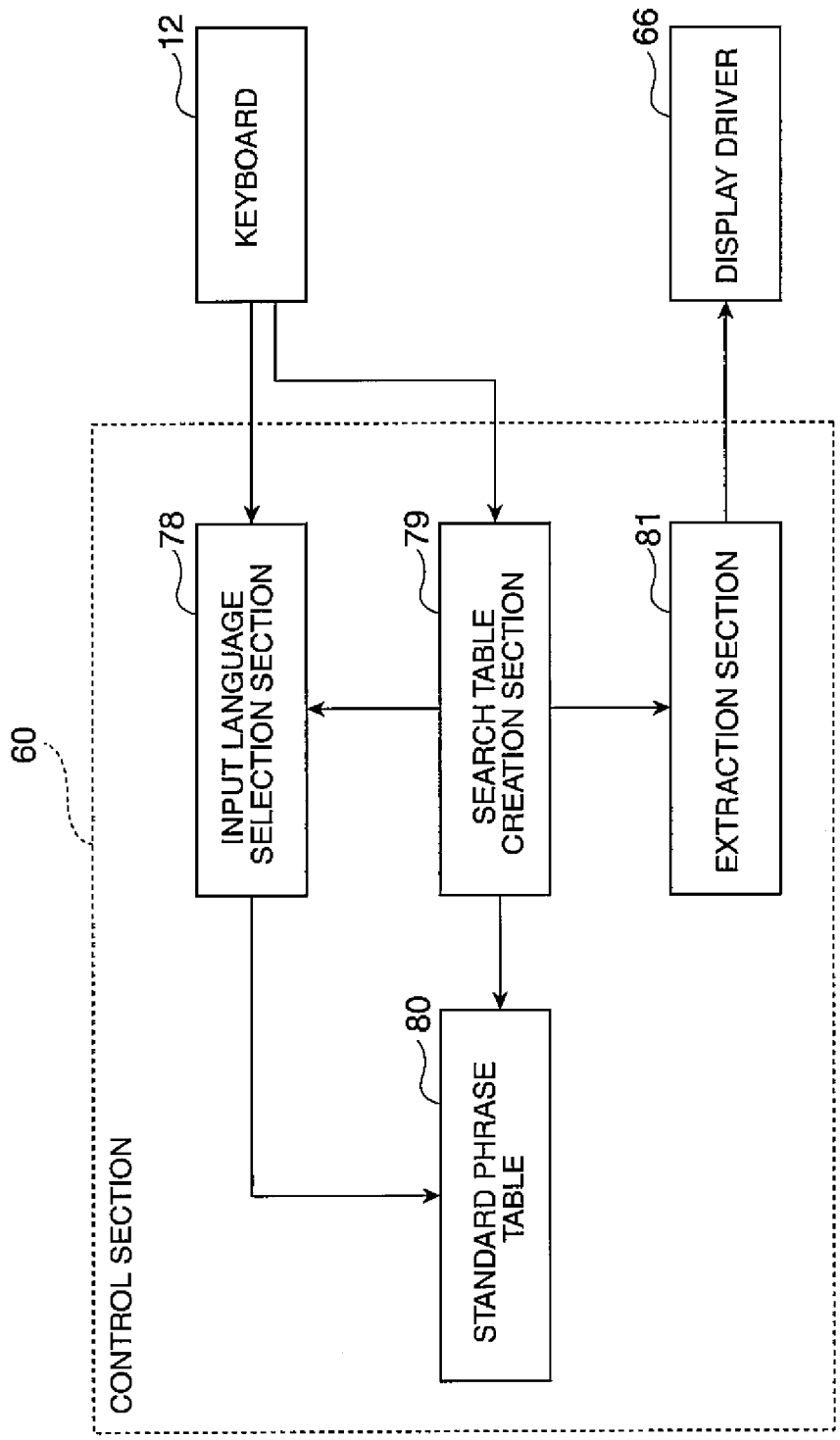
FIG. 5 is a functional block diagram showing a function realized by a control section of the tape printer.

Further, in the present embodiment, the control section 60 realizes various functions shown in FIG. 5. Specifically, the functions of an input language selection section 78, a search table creation section 79, a standard phrase table 80, and an extraction section 81.

Figure 6A:
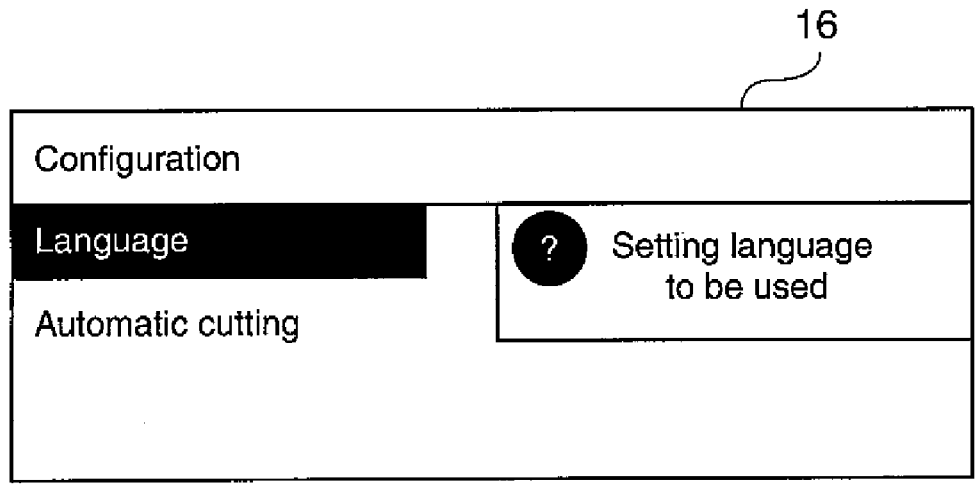
FIGS. 6A and 6B are schematic diagrams of a configuration screen and a language setting screen, respectively, displayed on the display.
Figure 6B:
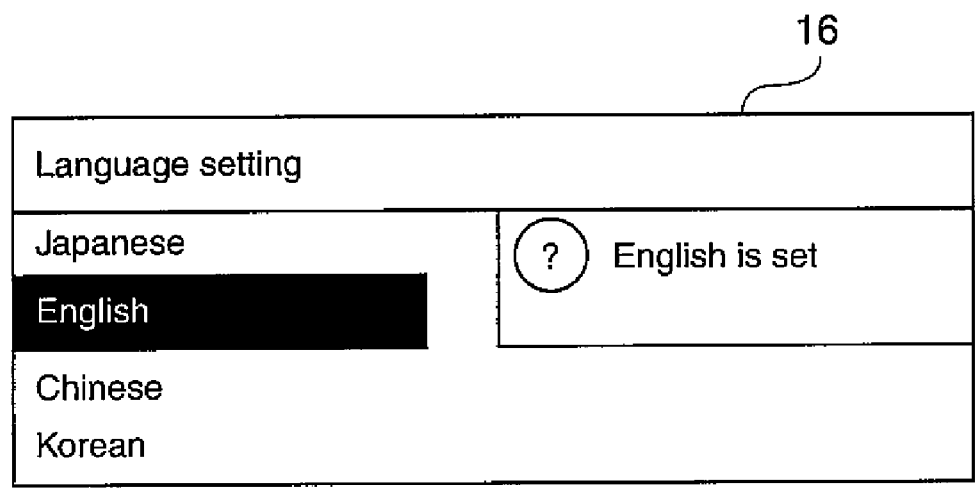

The input language selection section 78 performs setting of the language to be used, in response to the input for selecting the input language. For example, when a mode key out of the function keys included in the keyboard 12 is held down, the menu screen is displayed on the display 16, and it becomes possible to perform setting of the operation environment of the tape printer 1. In the present embodiment, as shown in FIG. 6A, it is possible to select the language to be used in a standard foreign language print function (the standard phrase print function) from the configuration menu screen and then set the language. When the user selects "language" from the menu screen shown in FIG. 6A, the language setting screen shown in FIG. 6B is displayed. Here, it is arranged that either one of "Japanese", "English", "Chinese", and "Korean" can be selected. When receiving the input of selecting either language out of the languages shown in FIG. 6B, the input language selection section 78 changes the setting of the language used in the standard foreign language print function.

The standard foreign language print function denotes a function of printing translation phrases obtained by translating one phrase into a plurality of phrases of respective languages side by side as a set of phrases. Specifically, it is the function that in the case in which "Japanese" is set in the language setting, when "A I SU KU RI-MU" (Hiragana) is input using the Hiragana input, four phrases of the respective languages, "A I SU KU RI-MU" (Katakana) as a Japanese printing description, "ice cream" as an English printing description, a Chinese printing description, and a Korean printing description are displayed in the print layout while forming a set, thus the four language descriptions can be printed side by side.

Figure 7A:
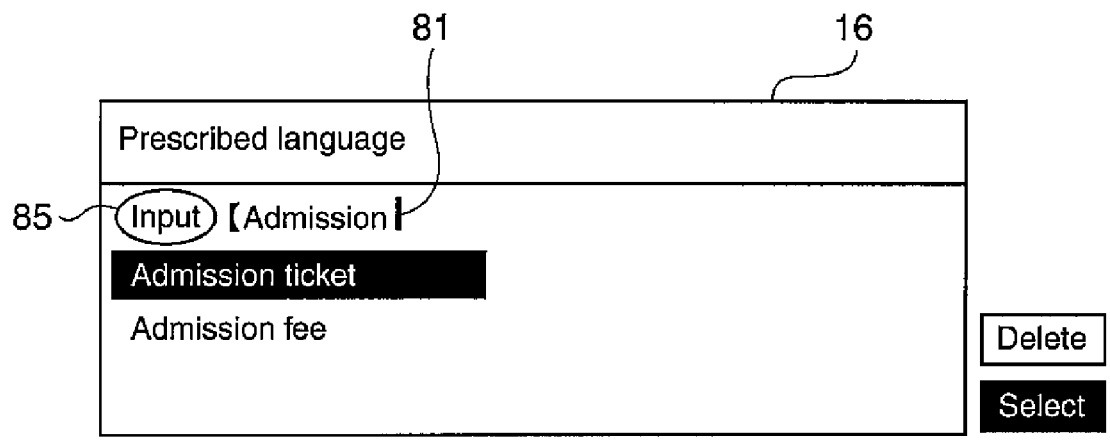
FIGS. 7A and 7B are schematic diagrams of a standard phrase input screen and a standard phrase calling screen, respectively, displayed on the display.
Figure 7B:
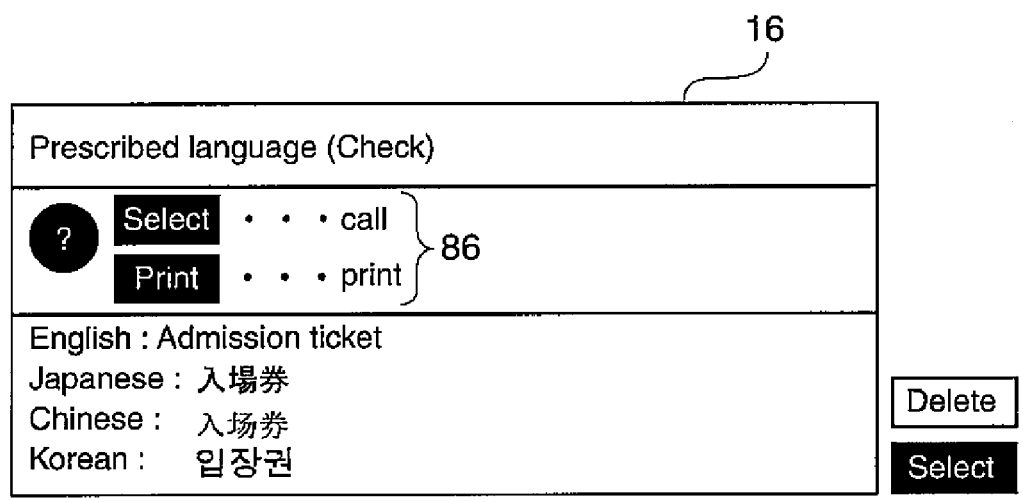

Although in the related art technology, the language setting deals only with the Japanese input, in the present embodiment, it is also possible to set "English", "Chinese", or "Korean". Specifically, when the language setting is performed while selecting "English", the input language is set to be English as shown in FIGS. 7A and 7B, and then the guide messages 85, 86 are switched from the Japanese description to the English description. Therefore, even the user unfamiliar to Japanese can easily make full use of the standard foreign language print function providing the user knows any other language, English in this case.

Specifically, as shown in FIG. 7A, when the user input "Admission" using the keyboard 12, candidates are displayed out of the standard phrases registered in the standard phrase table 80 previously stored in the CGROM 76 of the tape printer 1. Here, "Admission Ticket" and "Admission Fee" are displayed as the candidates.

As shown in FIG. 8, the standard phrase table 80 is a table having a list structure in which Japanese (a specific language) standard phrases provided with record numbers (sequential numbers) according to the Japanese 50-character kana syllabary (a specific rule), and standard phrases of English, Chinese, and Korean (other languages than Japanese) are made to correspond to each other, and a subsequent record number (a sequential number indicating the subsequent search destination) is assigned to each of the standard phrases of English, Chinese, and Korean.

The search table creation section 79 creates a search table corresponding to the language, which the input language selection section 78 selects based on the input characters input from the keyboard and the record number in the standard phrase table 80.

Specifically, in the case in which "English" is set in the language setting, the search table creation section 79 refers to the first record table of "English", and obtains the first record number. FIG. 9A shows an example of the first record table of "Japanese", and FIG. 9B shows an example of the first record table of "English". The first record table is for showing a search start record number of the standard phrase table 80 shown in FIG. 8.

Further, when obtaining the search start record number, the search table creation section 79 jumps to the first record number of the standard phrase table 80, and then follows sequentially the subsequent record number of the selected language, thereby narrowing the phrases to create the search table.

FIG. 10 shows a search table the search table creation section 79 creates by following the phrases having the first character of "A" in alphabetical order in the case in which "English" is set in the language setting. As shown in FIGS. 8 and 10, since all of the standard phrases are each provided with the subsequent record number, if the search start record number is known, the search table can easily be created. Further, in the case in which the subsequent character to the first character is input, the search table created based on the first character can further be narrowed based on the second character. FIG. 11A is the search table obtained as a result of narrowing down the search table with the second character "d," and FIG. 11B is the search table obtained as a result of further narrowing down the search table with the third character "m." It should be noted that FIG. 11C shows a result of narrowing down the search table into a single phrase using the finally distinguishable character "t."

The extraction section 81 extracts, from the standard phrase table 80, the standard phrase of the language selected finally and the standard phrases of other languages, corresponding to that standard phrase based on the search table the search table creation section 79 creates. Specifically, as shown in FIG. 11C, if the phrase obtained by finally narrowing down the search table is "Admission Ticket," the extraction section 81 extracts the phrases of other languages, corresponding to the record number "594" of this phrase from the standard phrase table 80. As shown in FIG. 8, the standard phrase of Japanese corresponding to the record number "594" is "nyu jyo ken" (Kanji), and the extraction section 81 extracts the standard phrases of Chinese and Korean in the same manner.

The set of standard phrases of English, Japanese, Chinese, and Korean thus extracted by the extraction section 81 is displayed side by side via the display driver 66 as shown in FIG. 7B. It should be noted that the display driver 66 displays the standard phrases so that the standard phrase of the language selected by the input language selection section 78 is disposed at the top thereof.

Figure 12:
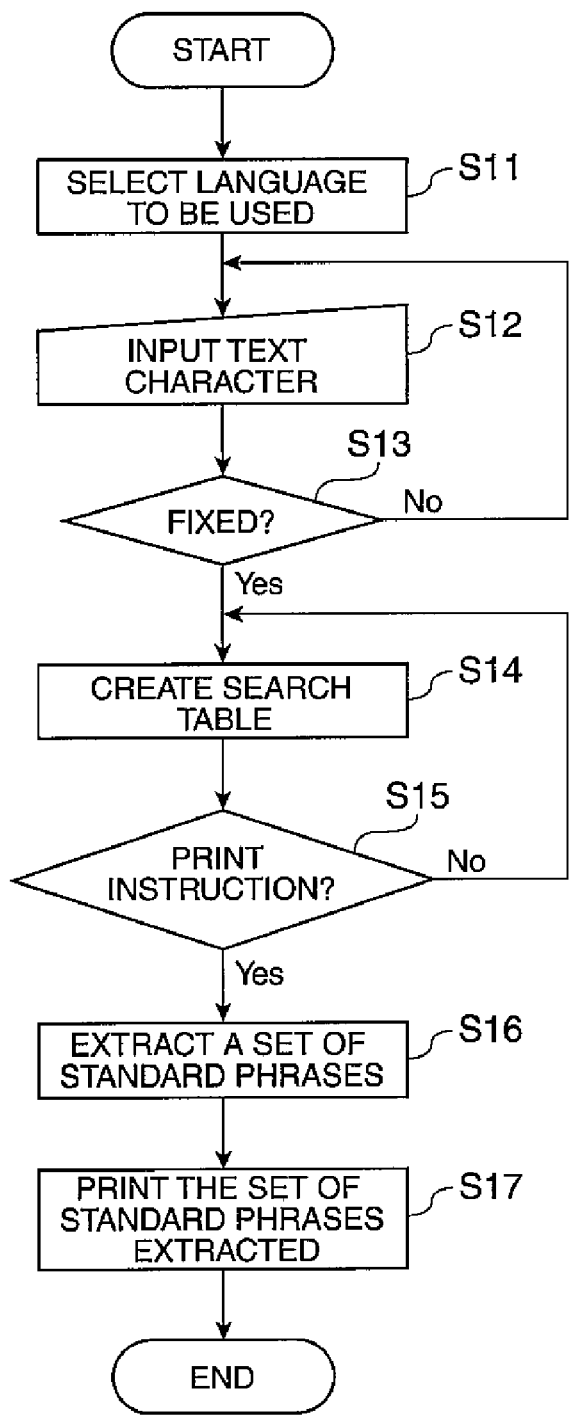
FIG. 12 is a flowchart for explaining a process of the standard phrase print function of the present embodiment.

Then, the process of the standard phrase print function according to the present embodiment described above will be explained along the flowchart shown in FIG. 12.

Firstly, when the user selects the language used in the standard phrase print function from the keyboard, the input language selection section 78 performs the selection of the language to be used therein based on the selection instruction (step S11). As described above, if "English" is selected, for example, it becomes hereinafter possible to input a desired standard phrase using English text characters in the standard phrase print function. Further, the guide messages 85, 86 (see FIGS. 7A and 7B) on the display are also displayed in English.

The user performs input of English text characters from the keyboard (step S12). If the input characters are fixed (Yes in the step S13), then the search table creation section 79 creates the search table (step S14) corresponding to the selected language with reference to the first record table shown in FIGS. 9A and 9B and the standard phrase table 80 shown in FIG. 8.

The search table creation section 79 narrows down the search table until the print instruction is issued (No in the step S15, and step S14), sand if holding down of the print key by the user occurs after the search table has finally been narrowed down to a singly standard phrase (Yes in the step S15), the extraction section 81 extracts (step S16) the set of standard phrases in accordance with the record number of the standard phrase thus obtained by the narrowing down operation. In the present embodiment, the set of standard phrases of the four languages, English, Japanese, Chinese, and Korean is extracted, and the print section 63 prints the processing tape T with the set of standard phrases (step S17).

As described above, according to the present embodiment, the input language in the standard phrase print function can be selected. Although in the related art technology the search in the standard phrase table can only be performed by the Japanese Hiragana input, according to the tape printer 1 of the present embodiment, even the user unfamiliar to Japanese can conduct the search for the standard phrase using the language suitable for the user.

Further, since the search table corresponding to the selected language is created based on the single standard phrase table 80 held previously, there is no need for previously preparing the search tables corresponding respectively to the languages. Therefore, compression is not exerted on both of the product development cost and the memory for storing the search table.

Further, according to the present embodiment, since there can be obtained the print result in which the standard phrase of the selected input language is disposed at the top thereof, it is possible to perform the tape printing best suitable for the user who has selected the input language.

Further, according to the present embodiment, the search table can be created from the standard phrase table 80 provided previously using the input characters and the record number. Therefore, even in the case in which the Japanese input is set as an initial setting value, it is possible to extract the appropriate set of standard phrases even by the input characters of English, Chinese, Korean, or the like by creating the search table corresponding to the language.

It should be noted that although in the embodiment described above the standard phrase table has a configuration of including the four languages of Japanese, English, Chinese, and Korean, it is obvious that the invention is not limited to these languages.

Further, the selection of the input language in the standard phrase print function is not limited to the method of setting it on the configuration screen as shown in FIGS. 6A and 6B. It is also possible to automatically set the used language frequently used in the function other than the standard phrase print function, namely in the normal text input mode, as the input language in the standard phrase print function. It can be assumed that the input language executed in the function other than the standard phrase print function is the input language used with relatively high frequency in the tape printer 1. Therefore, even in the case of switching the function in use to the standard phrase print function, by automatically selecting the input language used with high frequency, it is possible to provide the tape printer 1 more superior in operability.

What is claimed is:

1. A tape printer provided with a standard phrase print function adapted to print a plurality of standard phrases as a set, the tape printer comprising:
    a selection section adapted to select an input language in the standard phrase print function;
    a search table creation section adapted to create a search table corresponding to the selected input language;
    an extraction section adapted to extract the standard phrase of the selected input language and the standard phrase of a language other than the selected input language based on the created search table, the standard phrase of the selected input language and the standard phrase of the other language corresponding to each other;
    a print section adapted to print the extracted standard phrases as the set; and
    a standard phrase table having the standard phrase of a specific language provided with a sequential number along a specific rule and the standard phrase of a language other than the specific language so as to correspond to each other, the sequential number designating a subsequent search destination being assigned to the standard phrase of the other language,
    wherein the search table creation section creates the search table based on an input character and the sequential number.

2. The tape printer according to claim 1, wherein the print section performs printing so that the standard phrase of the selected input language disposed at a top of the extracted standard phrases.

3. The tape printer according to claim 1, wherein the selection section automatically selects an input language, which is selected in a function other than the standard phrase print function, in the standard phrase print function.

4. A method of controlling a tape printer provided with a standard phrase print function adapted to print a plurality of standard phrases as a set, the method including the steps of:
    (a) selecting an input language in the standard phrase print function;
    (b) creating a search table corresponding to the selected input language;
    (c) extracting the standard phrase of the selected input language and the standard phrase of a language other than the selected input language based on the created search table, the standard phrase of the selected input language and the standard phrase of the other language corresponding to each other;
    (d) printing the extracted standard phrases as the set; and
    (e) using a standard phrase table having the standard phrase of a specific language provided with a sequential number along a specific rule and the standard phrase of a language other than the specific language so as to correspond to each other, the sequential number designating a subsequent search destination being assigned to the standard phrase of the other language,
    wherein the search table is created based on an input character and the sequential number.

5. A computer program embodied on a non-transitory computer-readable medium, which is provided to make a tape printer having a standard phrase print function adapted to print a plurality of standard phrases as a set, perform a process comprising:
 (a) selecting an input language in the standard phrase print function;
 (b) creating a search table corresponding to the selected input language;
 (c) extracting the standard phrase of the selected input language and the standard phrase of a language other than the selected input language based on the created search table, the standard phrase of the selected input language and the standard phrase of the other language corresponding to each other;
 (d) printing the extracted standard phrases as the set; and
 (e) using a standard phrase table having the standard phrase of a specific language provided with a sequential number along a specific rule and the standard phrase of a language other than the specific language so as to correspond to each other, the sequential number designating a subsequent search destination being assigned to the standard phrase of the other language,
wherein the search table is created based on an input character and the sequential number.

* * * * *